United States Patent
Ikeguchi et al.

(10) Patent No.: US 6,792,234 B2
(45) Date of Patent: Sep. 14, 2004

(54) DEVELOPING DEVICE HAVING A DEVELOPER CARRIER INCLUDING MAIN AND AUXILIARY MAGNETIC POLES AND IMAGE FORMING APPARATUS USING THE SAME

(75) Inventors: Hiroshi Ikeguchi, Saitama (JP);
Tsukuru Kai, Kanagawa (JP);
Takeyoshi Sekine, Tokyo (JP);
Toshihiko Yamanaka, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/083,159

(22) Filed: Feb. 27, 2002

(65) Prior Publication Data

US 2002/0164180 A1 Nov. 7, 2002

(30) Foreign Application Priority Data

Feb. 28, 2001 (JP) ........................................ 2001-053568
Mar. 9, 2001 (JP) ........................................ 2001-065907

(51) Int. Cl.[7] ............................................. G03G 15/08
(52) U.S. Cl. ....................................................... 399/267
(58) Field of Search ................................ 399/267, 222, 399/270

(56) References Cited

U.S. PATENT DOCUMENTS

| 5,109,254 | A | | 4/1992 | Oka et al. |
|---|---|---|---|---|
| 5,227,842 | A | | 7/1993 | Hayashi et al. |
| 5,327,199 | A | | 7/1994 | Sekine |
| 5,416,568 | A | | 5/1995 | Yoshiki et al. |
| 5,598,254 | A | | 1/1997 | Ikesue et al. |
| 5,771,426 | A | * | 6/1998 | Oka et al. .................... 399/119 |
| 5,774,772 | A | | 6/1998 | Kai et al. |
| 5,915,155 | A | | 6/1999 | Shoji et al. |
| 6,081,684 | A | | 6/2000 | Naganuma et al. |
| 6,125,243 | A | | 9/2000 | Shoji et al. |
| 6,198,895 | B1 | * | 3/2001 | Tsuda et al. ................. 399/267 |
| 6,295,437 | B1 | | 9/2001 | Hodoshima et al. |
| 6,335,137 | B1 | | 1/2002 | Suzuki et al. |
| 6,337,957 | B1 | | 1/2002 | Tamaki et al. |
| 6,366,751 | B1 | | 4/2002 | Shakuto et al. |
| 6,385,423 | B1 | | 5/2002 | Kai |
| 6,403,275 | B1 | | 6/2002 | Kuramoto et al. |
| 6,442,364 | B2 | | 8/2002 | Kai et al. |
| 6,449,452 | B1 | | 9/2002 | Kai |
| 6,456,806 | B2 | | 9/2002 | Shoji et al. |
| 6,468,706 | B2 | | 10/2002 | Matsuda et al. |
| 6,507,718 | B2 | | 1/2003 | Ohjimi et al. |
| 6,567,638 | B2 | * | 5/2003 | Nakamura et al. .......... 399/286 |

FOREIGN PATENT DOCUMENTS

| JP | 62-968 | * | 1/1987 |
|---|---|---|---|
| JP | 9-197833 | | 7/1997 |
| JP | 10-48958 | | 2/1998 |
| JP | 2000-231258 | | 8/2000 |
| JP | 2000-305360 | | 11/2000 |
| JP | 2001-005296 | | 1/2001 |

* cited by examiner

Primary Examiner—Quana Grainger
(74) Attorney, Agent, or Firm—Oblon, Spivak, McClelland, Maier & Neustadt, P.C.

(57) ABSTRACT

A developing device capable of obviating carrier deposition on an image carrier and uniformly distributing toner on a developer carrier is disclosed. A developer deposited on the developer carrier and moved away from a metering member rises in the form of a magnet brush, falls down, and again rises in accordance with the movement of the developer carrier. The toner of the developer is efficiently agitated in the axial direction of the developer carrier in a narrow zone between the first metering member and a developing zone.

21 Claims, 9 Drawing Sheets

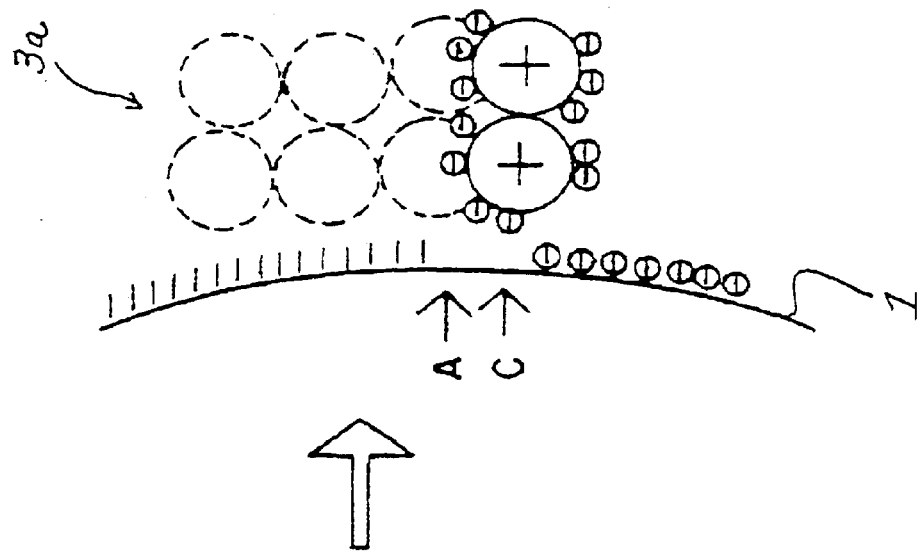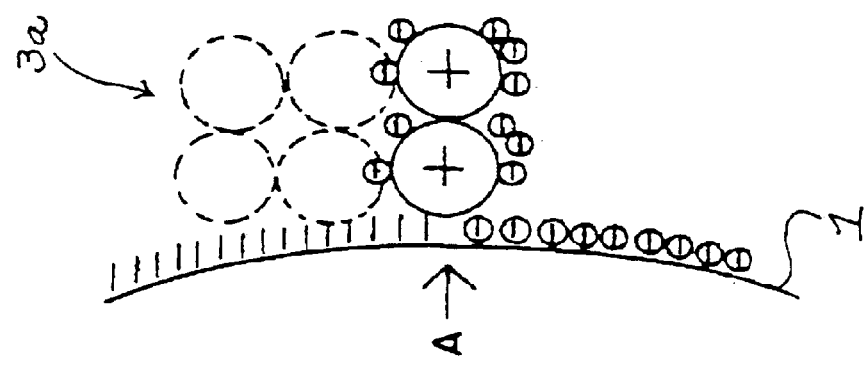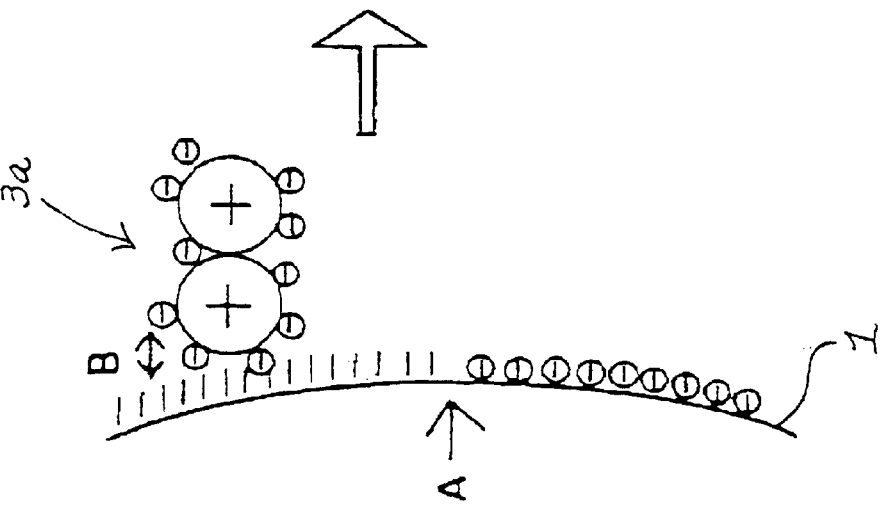

COMPLETE IMAGE

IMAGE WITH TRAILING EDGE LOST

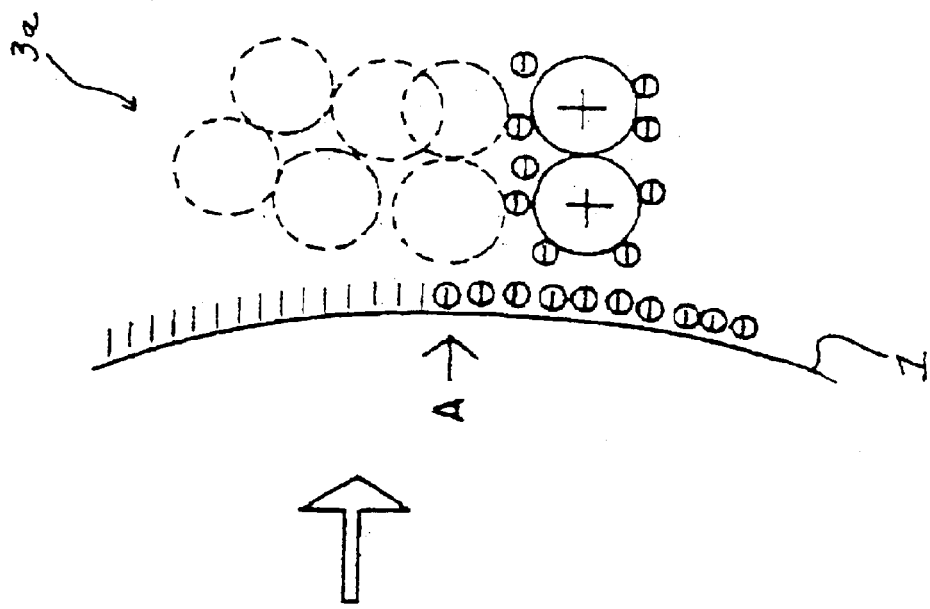
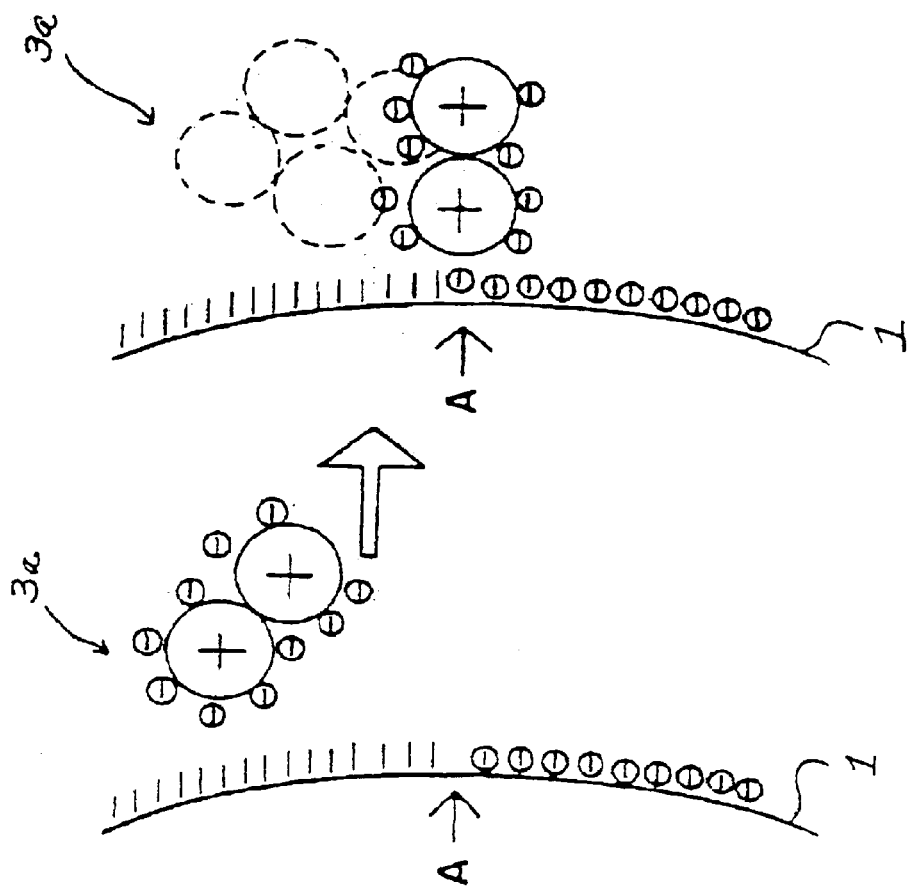

DEVELOPING DEVICE HAVING A DEVELOPER CARRIER INCLUDING MAIN AND AUXILIARY MAGNETIC POLES AND IMAGE FORMING APPARATUS USING THE SAME

BACKGROUND OF THE INVENTION

1. Field of the Invention

The present invention relates to a copier, facsimile apparatus, printer, direct digital master making machine or similar electrophotographic image forming apparatus. More particularly, the present invention relates to a developing device of the type developing a latent image with a magnet brush and an image forming apparatus using the same.

2. Description of the Background Art

Generally, an electrophotographic image forming apparatus includes an image carrier implemented as a photoconductive drum or a photoconductive belt. A developing device develops a latent image formed on the image carrier to thereby produce a corresponding toner image. It is a common practice with this type of image forming apparatus to use either one of a one-ingredient type developer or toner and a two-ingredient type developer, i.e., a mixture of toner and carrier grains. Development using the two-ingredient type developer features desirable image transferability and desirable developing characteristics against temperature and humidity. The two-ingredient type developer forms brush chains on a developer carrier in a developing zone where the developer carrier faces the image carrier. The toner is fed from the developer on the developer carrier to a latent image formed on the image carrier.

As for the development using the two-ingredient type developer, a decrease in the distance between the image carrier and the developer carrier in the developing zone allows high image density to be easily attained and reduces so-called edge effect. This, however, is apt to cause the trailing edge of a black solid image or that of a halftone solid image to be lost. Let this undesirable phenomenon be referred to as the omission of a trailing edge hereinafter.

The omission of a trailing edge can be reduced if a nip where the magnet brush contacts the surface of the image carrier is reduced in width in the direction of movement of the above surface, as reported in the past. The omission of a tailing edge can be further reduced if the magnet brush is dense at the nip, as also reported in the past.

Further, when the magnet brush is cut off on contacting the image carrier due to a shock, an electric force greater than a magnetic force prevents the magnetic carrier to be returned to the developer carrier. As a result, the magnetic carrier deposits on the non-image portion of the image carrier. Assume that image transfer and fixation are effected after development with the carrier depositing on the image carrier. Then, the carrier is transferred from the image carrier to a sheet together with a toner image and therefore scratches a fixing roller, resulting in a defective image.

On the other hand, the developer is agitated for uniformly distributing the carrier and toner. However, stress ascribable to agitation increases the stress of the toner and carrier, increasing the amount of charge. It is therefore necessary to raise a bias for development. Such a bias, however, reduces the service life of the image carrier.

If the magnetic force of the developer carrier is increased to surely retain the carrier, then heat is generated due to the rotation of the developer carrier or the torque for driving the developer carrier must be increased. In addition, it is difficult to reduce the size of the developer carrier.

The amount of charge deposited on the toner and carrier noticeably varies at the time of toner transfer. Consequently, the carrier is apt to scatter until the restoration of the original amount of charge.

Moreover, when the linear velocity of the developer carrier is increased, the agitation of the toner becomes short and causes the toner with a non-uniform distribution to reach the developing zone between the image carrier and the developer carrier. Particularly, in the case of a halftone image, the non-uniform toner distribution is apt to bring about irregular image density in the vertical direction of an image. It is known that irregular image density in the vertical direction is ascribable to minute differences in the toner content of the developer in the lengthwise direction.

Technologies relating to the present invention are disclosed in, e.g., Japanese Patent Laid-Open Publication Nos. 9-197833, 10-48958, 2000-231258, 2000-305360, and 2001-5296.

SUMMARY OF THE INVENTION

It is a first object of the present invention to provide a developing device capable of uniformly distributing toner on a developer carrier, and an image forming apparatus using the same.

It is a second object of the present invention to provide a developing device capable of obviating carrier deposition, and an image forming apparatus using the same.

A developing device of the present invention includes a developer carrier for conveying a developer, which consists of toner and magnetic carrier, deposited thereon. In a developing zone, the developer carrier causes the developer to form a magnet brush with a main magnetic line of force issuing from a main magnetic pole, which is positioned inside the developer carrier. The toner is fed to an image carrier in the developing zone. A first metering member is positioned upstream of the developing zone in the direction of developer conveyance for regulating the amount of the developer being conveyed by the developer carrier toward the developing zone. A space is formed for collecting part of the developer removed by the first metering member. A toner hopper adjoins the above space for replenishing fresh toner to the developer carrier. A second metering member is positioned upstream of the first metering member in the direction of developer conveyance. A gap is formed between the second metering member and the developer carrier for preventing, when the toner content of the developer on the developer carrier increases to increase the thickness of the developer forming a layer on the developer carrier, the increment of the developer carrier from passing. A condition in which the developer and fresh toner contact each other varies in accordance with the toner content of the developer present on the developer carrier, varying the condition of replenishment of the fresh toner to the developer. At least one auxiliary magnetic line of force is positioned between the developing zone and the first metering member.

An image forming apparatus including the above developing device is also disclosed.

BRIEF DESCRIPTION OF THE DRAWINGS

The above and other objects, features and advantages of the present invention will become more apparent from the following detailed description taken with the accompanying drawings in which:

FIGS. 2A through 2C demonstrate how the trailing edge of an image is lost in the apparatus of FIG. 1;

FIGS. 5A through 5C show how toner drift at a nip for development is reduced;

DESCRIPTION OF THE PREFERRED EMBODIMENTS

Figure 1:
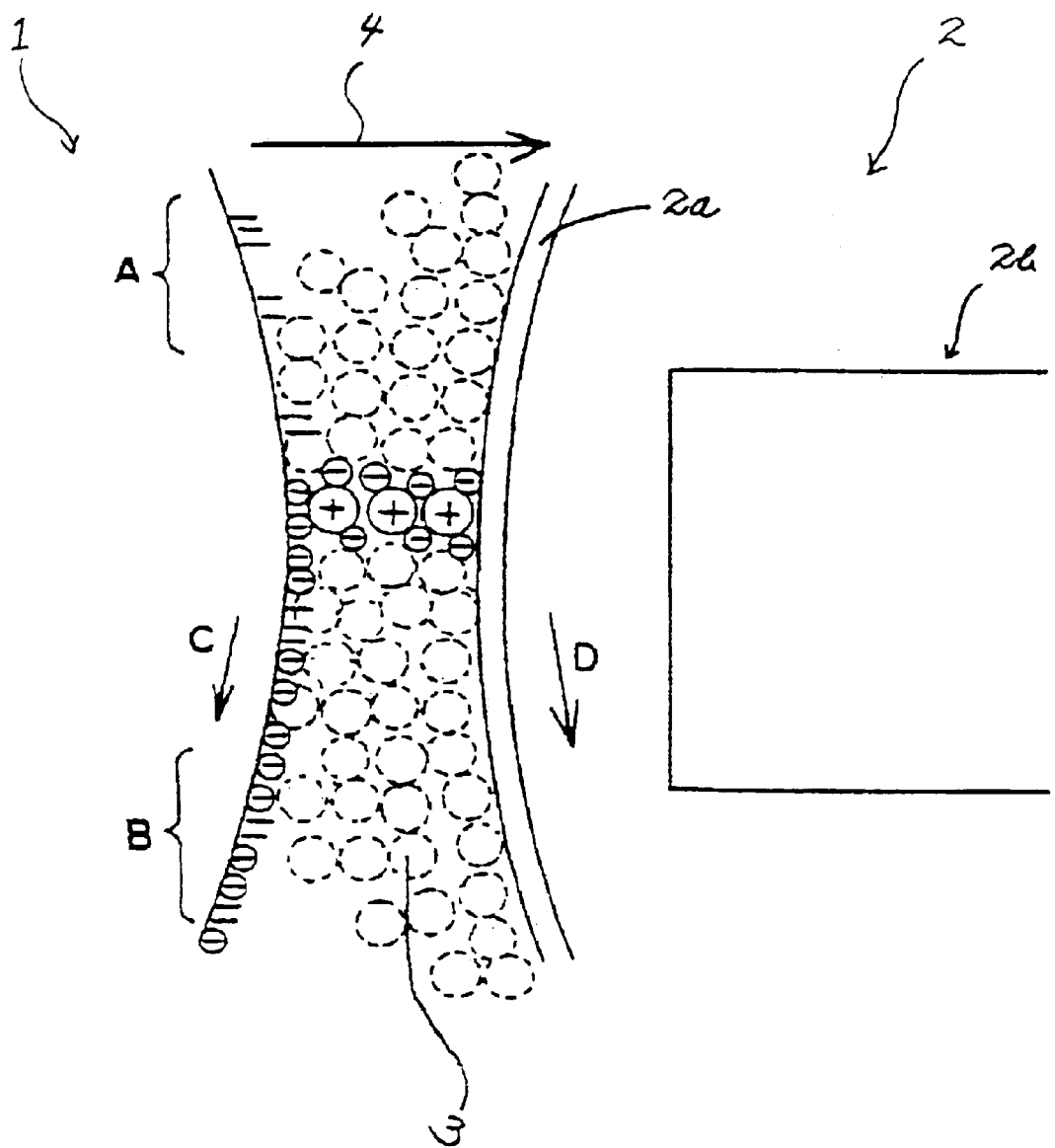
FIG. 1 is an enlarged front view showing a nip between a photoconductive element and a developing roller included in a conventional image forming apparatus.

To better understand the present invention, the omission of the trailing edge of an image will be described more specifically with reference to FIG. 1. FIG. 1 shows a developing section for executing negative-to-positive development with a two-ingredient type developer. As shown, a photoconductive drum or image carrier 1 and a developing roller or developer carrier 2 face each other. The developing roller 2 is made up of a sleeve 2a movable in a direction D and a magnet 2b fixed in place in the sleeve 2a. The magnet 2b forms a magnetic pole for development. The sleeve 2a conveys the developer, i.e., toner and carrier mixture deposited thereon toward a developing zone where the sleeve 2a faces the drum 1.

The carrier rises on the sleeve 2a in the form of brush chains in the developing zone, forming a magnet brush 3. In FIG. 1, small circles and large circles are representative of toner grains and carrier grains, respectively. Only one of the brush chains intervening between the drum 1 and the sleeve 2a is indicated by solid circles; the other brush chains are indicated by phantom circles, and toner grains are not shown.

The drum 1 rotates in a direction C while carrying a latent image thereon. Assume that the non-image portion of the drum 1 has been changed to negative polarity, as represented by a range A in FIG. 1. In the developing zone, the magnet brush 3 rubs itself against the latent image with the result that the toner grains deposit on the latent image due to an electric field 4 for development. Consequently, a toner image is formed on the drum 1 at the downstream side of the developing zone, as indicated by range B.

The width over which the magnet brush 3 contacts the surface of the drum 1 in the direction of movement of the drum 1 will be referred to as a nip width hereinafter. If only one point of the sleeve 2a contacts one point of the drum 1, then sufficient image density is not available. It is therefore a common practice to cause each of the drum 1 and sleeve 2a to move at a particular linear velocity, so that the sleeve 2a can contact one point of the drum 1 over a certain range thereof. In FIG. 1, the sleeve 2a is assumed to move at a higher linear velocity than the drum 1.

The mechanism that causes the trailing edge of an image to be lost will be described hereinafter. FIGS. 2A through 2C are enlarged views of the developing zone and show the tip 3a of the brush chain 3 sequentially approaching the drum 1; time expires in the order of FIGS. 2A, 2B and 2C. In FIGS. 2A through 2C, the boundary between the non-image portion and the black, solid image portion of the drum 1 is being developed at the position where the drum 1 and sleeve 2a, not shown, face each other. In this condition, the omission of a trailing edge is apt to occur. A toner image just formed is present on the drum 1 at the downstream side of the above position in the direction of rotation of the drum 1. The tip 3a of the brush chain approaches the drum 1 in such a condition. While the drum 1 is, in practice, rotating clockwise, as viewed in FIGS. 2A through 2B, the tip 3a passes the drum 1 because the sleeve 2a is moving at a higher linear velocity than the drum 1. For this reason, the drum 1 is assumed to be stationary in FIGS. 2A through 2C for simplicity.

As shown in FIG. 2A, the tip 3a of the brush chain approaching the drum 1 passes the non-image portion before it reaches a position A where the boundary mentioned above is positioned. At this instant, repulsion B acts between the negative charge deposited on the drum 1 and the negative charge deposited on the toner grains, causing the toner grains to move away from the drum 1 toward the sleeve 2a little by little. This phenomenon is generally referred to as toner drift. As a result, as shown in FIG. 2B, when the tip 3a arrives at the position A, the carrier grain charged to positive polarity is exposed to the outside without any toner grain depositing on the latent image. The latent image is therefore not developed at the above position at all.

As shown in FIG. 2C, when the tip 3a reaches a position C, toner grains present on the drum 1 are apt to again deposit on the carrier grains of the tip 3a if adhesion acting between the above toner grains and the drum 1 is weak. This is why the trailing edge of the toner image is lost.

Figure 3A:
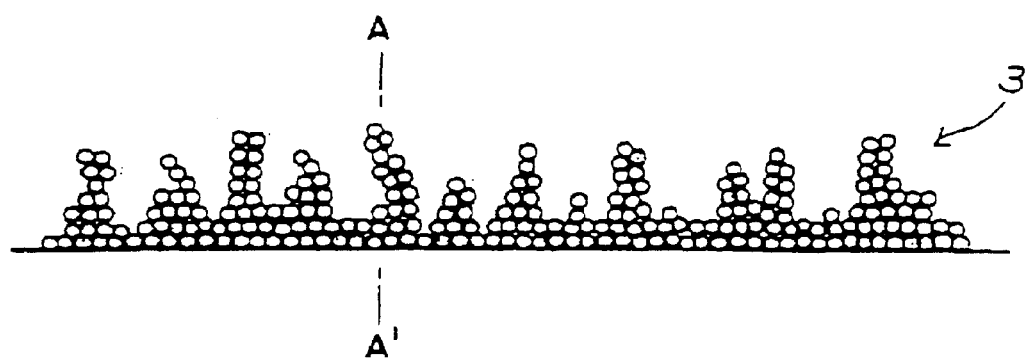
FIG. 3A is a sketch showing a magnet brush whose brush chains are different in height in the axial direction of the developing roller.
Figure 3B:
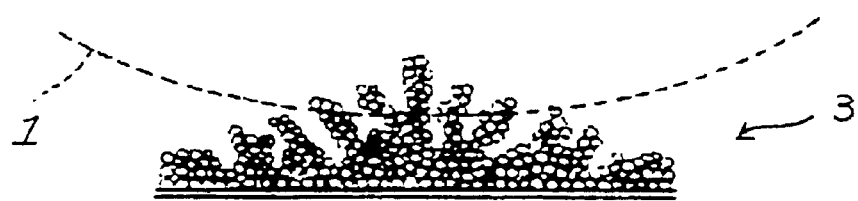
FIG. 3B is a section along line A–A' of FIG. 3A, showing the magnet brush of FIG. 3A in a plane perpendicular to the axis of the developing roller.

The mechanism described above has concentrated on a single section of the developing zone where the drum 1 and sleeve 2a face each other. The brush chains of the magnet brush 3 differ in length, or height, as viewed in the axial direction of the sleeve 2a. Specifically, FIG. 3A shows the magnet brush 3 in the axial direction of the sleeve 2a while FIG. 3B shows it in a section along line A–A' of FIG. 3a. FIG. 3B shows the positional relation between the magnet brush 3 and the drum 1 in order to indicate the relation between FIG. 3B and the other figures.

Figure 4A:
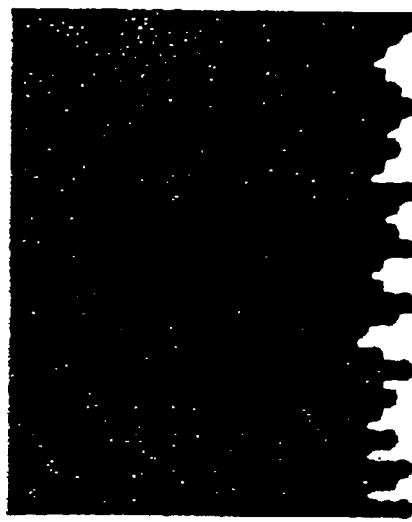
FIGS. 4A through 4D show a relation between the omission of a trailing edge and the density of a magnet brush.
Figure 4B:
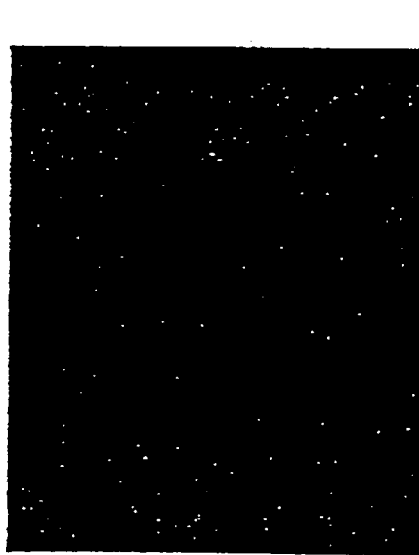

As shown in FIG. 3A, the brush chains of the magnet brush 3 noticeably differ in height in the axial direction of the sleeve 2a and therefore do not contact the drum 1 at the same level in the above direction. The degree of toner drift therefore differs from one brush chain to another brush chain in the axial direction of the sleeve 2a. This brings about the omission of a trailing edge that is jagged in the axial direction of the sleeve 2a, as shown in FIG. 4B. Further, the mechanism described above reduces the width of a thin horizontal line, compared to that of a thin vertical line, and makes the shape of a solitary dot unstable.

The omission of a trailing edge can be reduced if the nip width is reduced or if a dense magnet brush is formed at the nip, as stated earlier. Presumably, by reducing the nip width in the developing zone, it is possible to reduce the period of time over which the magnet brush 3 contacts the non-image portion of the drum 1 and therefore to reduce toner drift. This will be described more specifically with reference to FIGS. 5A through 5C.

FIGS. 5A through 5C are views similar to FIGS. 2A through 2C except that the nip width is reduced. As shown in FIG. 5A, the period of time over which the tip 3a of the magnet brush contacts the drum 1 is reduced, reducing toner drift. As shown in FIG. 5B, the toner grains deposit on the drum 1 at the position A because of the reduced toner drift. Subsequently, as shown in FIG. 5C, toner grains present on the drum 1 are prevented from again depositing on the carrier grains because the carrier grains are not exposed to the outside. This successfully reduces the omission of a trailing edge.

The nip width can be effectively reduced if the half width of the magnetic pole 2b is reduced. It is to be noted that the half width refers to the angular width over which the magnetic force of the main pole is one half of the maximum or peak magnetic force of the magnetic force distribution curve in the normal direction. For example, if the maximum magnetic force of the magnetic pole 2b, which is an N pole, is 120 mT, then the half width refers to an angular width over which the magnetic force is 60 mT.

However, experiments showed that reducing the half width of the magnetic pole 2b could not fully obviate the omission of a trailing edge alone. This is presumably because the nip cannot be easily reduced at all positions in the axial direction of the sleeve 2a. More specifically, the height of the magnet brush 3 is irregular in the axial direction of the sleeve 2a, as stated earlier with reference to FIGS. 3A and 3B. If the magnet brush is higher at a certain portion than at the other portions in the axial direction of the sleeve 2a, then the nip is not reduced at such a portion, resulting in toner drift. In light of this, a developing device configured to make the magnet brush 3 dense at the nip in order to further reduce the omission of a trailing edge has been proposed, as stated earlier. Why the dense magnet brush 3 is free from irregular height in the axial direction of the sleeve 2a will be described with reference to FIGS. 4A through 4D hereinafter.

Figure 4C:
Figure 4D:
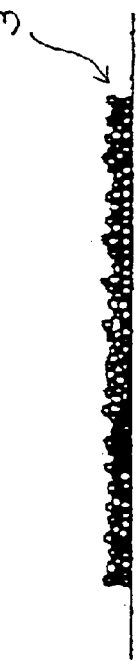

FIG. 4C shows the magnet brush 3 that is dense while FIG. 4D shows a conventional magnet brush. As shown in FIG. 4C, the dense magnet brush 3 has a minimum of irregularity in height in the axial direction of the sleeve 2a. FIG. 4A shows a solid image free from the omission of a trailing edge and formed by the dense magnet brush 3. By contrast, as shown in FIG. 4D, the conventional magnet brush is noticeably irregular in height in the above direction. FIG. 4B shows a solid image lost its trailing edge and formed by the conventional magnet brush.

As stated above, if the magnet brush 3 is sufficiently dense and therefore regulated in height before it reaches the nip, it enters the nip in a sufficiently uniform condition in the axial direction of the sleeve 2a. As a result, toner drift and therefore the omission of a trailing edge can be sufficiently reduced at all positions in the above direction.

The magnet brush 3 can be made dense if an attenuation ratio at which the flux density of the magnetic pole 2b forming the magnet brush 3 attenuates in the normal direction is increased. Assume that the above flux density in the normal direction measured on the surface of the sleeve 2a is x, and that the flux density in the same direction measured at a distance of 1 mm from the above surface is y. Then, the attenuation ratio is expressed as:

$$\frac{(x-y)}{x} \times 100 \, (\%)$$

For example, if the flux density on the surface of the sleeve 2a is 100 mT and if the flux density at the distance of 1 mm is 80 mT, then the attenuation ratio is 20%. To measure the flux density in the normal direction, use may be made of a gauss meter HGM-8300 and an axial probe Type A1 available from ADS. When the attenuation ratio was 40% or above, more preferably 50% or above, the magnet brush 3 was dense enough to sufficiently reduce irregularity in height in the axial direction of the sleeve 2a, as determined by experiments.

Why a high attenuation ratio makes the magnet brush 3 dense is presumably accounted for by the following. A high attenuation ratio sharply weakens the magnetic force as the distance from the sleeve surface increases. As a result, the magnetic force at the tip 3a of the magnet brush 3 becomes too weak to maintain the magnet brush 3. This causes the sleeve surface, which exerts a strong magnetic force, to attract the carrier grains present on the tip 3a.

To increase the attenuation ratio, the magnet 2a forming the magnetic pole for development may be formed of an adequate material. Alternatively, the magnetic line of force extending out from the above magnetic pole may be caused to more intensely turn round. For this purpose, auxiliary magnetic poles opposite in polarity to the above main magnetic pole may be respectively positioned upstream and downstream of the main pole in the direction of movement of the sleeve 2a. For the same purpose, the half width of the main pole may be reduced relative to the other poles, which include poles for conveyance, so that the magnetic line of force issuing from the main pole mostly turns round to the other poles.

Figure 6:
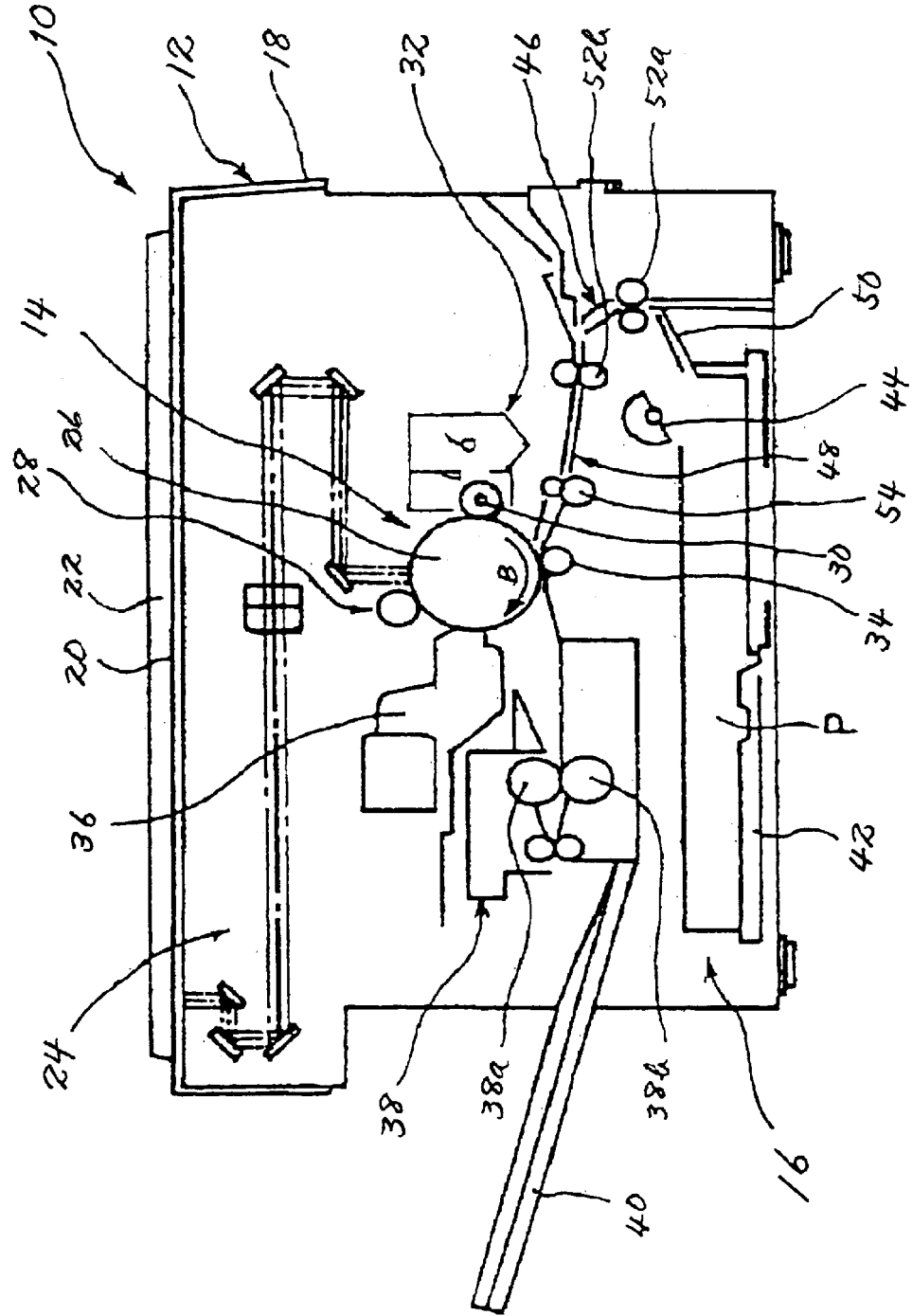
FIG. 6 is a view showing an image forming apparatus embodying the present invention.

Referring to FIG. 6, an image forming apparatus embodying the present invention and mainly directly toward the first object stated earlier will be described. The image forming apparatus is implemented as an electrophotographic copier by way of example. As shown, the copier, generally 10, is generally made up of a scanning section 12 for scanning a document, an image forming section 14 for forming an image, and a sheet feeding section 16 for feeding sheets one by one.

The scanning section 12 includes a glass platen 20 mounted on the top of a cover 18 surrounding the scanning section 12. A document to be copied is laid on the glass platen 20. A cover plate 22 is hinged to be openable away from the glass platen 20 and presses the document when closed. Optics 24 reads the document set on the glass platen 20.

The image forming section 14 includes an image carrier implemented as a photoconductive drum 26. Arranged around the drum 26 are a charger 28, a developing device 32, an image transferring device 34, and a cleaning device 36. The charger 28 uniformly charges the surface of the drum 26. The developing device 32 develops a latent image formed on the drum 26 with a sleeve 30 to thereby produce a corresponding toner image. The image transferring device 34 transfers the toner image from the drum 26 to a sheet or recording medium P. The cleaning device 36 removes toner left on the drum 26 after image transfer.

A fixing device 38 is positioned below the cleaning device 36 and includes a heat roller 38a and a press roller 38b pressed against the heat roller 38a. The press roller 38b presses the sheet P against the heat roller 38a. The sheet P with the toner image fixed thereon is driven out to a copy tray 40.

The sheet feeding section 16 is positioned in the lower portion of the copier 10 and includes a sheet cassette 42 loaded with a stack of sheets P. A pickup roller 44 adjoins one end of the sheet cassette 42 in the direction of sheet conveyance and pays out the sheets P from the sheet cassette 42 one by one. A sheet conveying device 46 conveys the sheet P paid out from the sheet cassette 42 toward an image transfer position between the drum 26 and the image transferring device 34.

The sheet conveying device 46 includes a plurality of guide plates 50 forming a generally U-shaped path 48, which extends from the right-hand side of the pickup roller 44 to the image transfer position. A first roller pair 52a, a second roller pair 52b and a registration roller pair 54 are positioned on the path 48.

Figure 7:
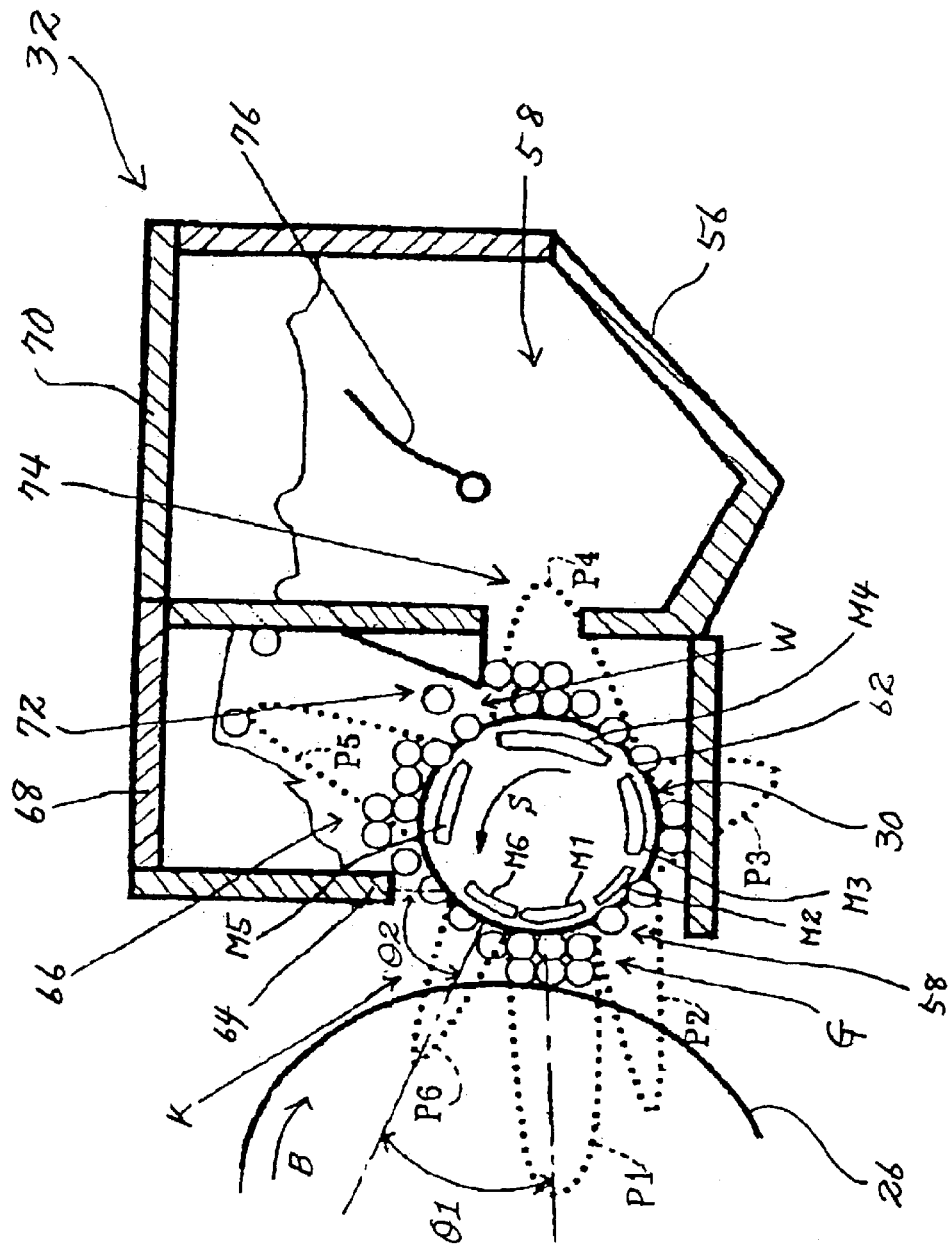
FIG. 7 is a front view of a developing device included in the illustrative embodiment.

FIG. 7 shows the developing device 32 in detail. The developing device 32 has an automatic, toner content control capability implemented with a small amount of two-ingredient type developer, as will be described in detail later. As shown, the developing device 32 is constructed into a single process cartridge together with the drum 26, charger 28, and cleaning device 36. The developing device 32 is positioned at one side of the drum or image carrier 26.

The developing device 32 includes a casing 56 formed with an opening that faces the drum 26. The previously mentioned sleeve or developer carrier 30 is partly exposed to the outside via the above opening. A two-ingredient type developer 58 stored in the casing 56 deposits on the sleeve 30. A magnet roller 62 is fixed in place inside the sleeve 30 and has a group of stationary magnets or magnetic field forming means. A doctor blade or first metering member 64 regulates the amount of the developer 58 deposited on and being conveyed by the sleeve 30. A cover member 68 is positioned above the sleeve 30 and forms a toner collecting space 66 between it and the sleeve 30. A toner hopper 70 stores fresh toner 58 to be replenished to the developer. A second metering member 72 is positioned upstream of the doctor blade 64 in the direction of rotation of the sleeve 30.

In the illustrative embodiment, a driveline, not shown, causes the sleeve 30 to rotate in a direction indicated by an arrow S in FIG. 7. The sleeve 30 has an outside diameter of 16 mm. A gap W exists between the second metering member 72 and the sleeve 30. When the toner content of the developer deposited on the sleeve 30 increases to increase the thickness of the developer layer, the gap W checks the increment of the developer. As a result, a condition in which the developer contacts the fresh toner present in the toner hopper 70 automatically changes in accordance with the toner content of the developer present on the sleeve 30. This varies a condition in which the fresh toner is replenished to the developer 30 on the sleeve 30.

More specifically, the toner hopper 70 is formed with an opening 74 adjoining the upstream side of the developer collecting space 66 in the direction S. A toner agitator or toner agitating member 76 is positioned in the toner hopper 70 in the vicinity of the opening 74. The toner agitator 76 conveys the toner 58 toward the opening 74 while agitating it.

In operation, the sleeve 30 in rotation conveys the developer 58 deposited thereon while the doctor blade 64 causes the developer to form a thin layer by regulating it. The thin developer layer 58 is conveyed to a developing zone G where the sleeve 30 faces the drum 26, which is also in rotation. In the developing zone G, the magnetic line of force P1 issuing from a main magnetic pole M1 causes the carrier and toner of the developer to form a magnet brush. The toner is then transferred from the sleeve 30 to a latent image formed on the drum 26, developing the latent image. The sleeve 30 further conveys the developer 58 moved away from the developing zone G to the developer collecting space 66 via the opening 74 of the hopper 70. The fresh toner 58 is packed in the opening 74.

The fresh toner 58 is replenished to the developer being conveyed by the sleeve 30 via the opening 74 and lowered in toner content due to development. On the other hand, part of the developer 58 removed by the doctor blade 64 before reaching the developing zone G moves toward the opening 74 within the developer collecting space 66 because of its own internal pressure and gravity. This part of the developer is then returned toward the doctor blade 64 in accordance with the movement of the developer present on the sleeve 30 and is circulated thereby.

In the illustrative embodiment, an auxiliary magnetic pole M6 is positioned between the doctor blade 64 and the developing zone G and forms an auxiliary magnetic line of force P6. The flux density ratio of the auxiliary magnetic line of force P6 to the main magnetic line of force P1 is selected to be 0.43 or above. Also, an angle θ1 between the peak of the main magnetic line of force P1 and that of the auxiliary magnetic line of force P6 is selected to be 45° or below. Further, an angle θ2 between the doctor blade 64 and the peak of the auxiliary magnetic line of force is selected to be 22°.

The magnetic line of force P6 causes the developer moved away from the doctor 64 to form a magnet brush before the main magnetic line of force P1 causes it to do so. At this instant, the auxiliary magnetic line of force P6 attracts excess toner toward the surface of the sleeve 30 and thereby prevents it from contributing to development. This successfully reduces the irregular density of a toner image to be formed. More specifically, the developer 64 moved away from the doctor blade 64 forms a magnet brush in the direction tangential to the magnetic line of force P6 over the axial dimension of the sleeve 30. Subsequently, the magnetic line of force P1 causes the developer to again form a magnet brush in the developing region G, so that the toner is transferred to the drum 26.

As stated above, the developer on the sleeve 30 moved away from the doctor blade 64 forms a magnet brush due to the auxiliary magnetic line of force P6, falls down between the auxiliary magnetic line of force P6 and the main magnetic line of force P1, and again forms a magnet brush in the developing zone G due to the main magnetic line of force P1. The toner of the developer is therefore agitated in the axial direction of the sleeve 30 in a narrow zone K between the doctor blade 64 and the developing zone G. This uniformly distributes the toner and thereby obviates irregular image density, particularly irregular image density in the vertical direction of an image.

Figure 8:
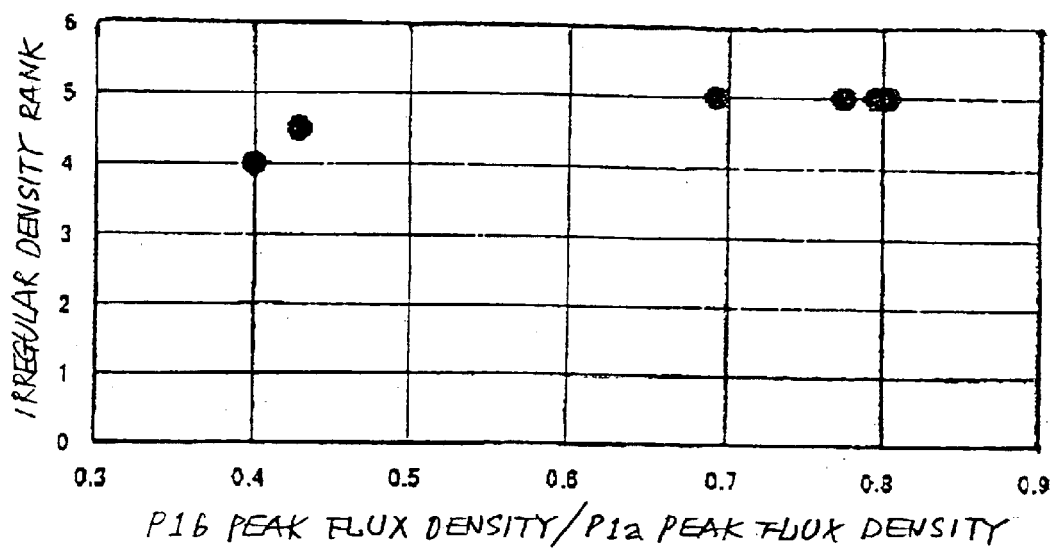
FIG. 8 is a graph showing a relation between a flux distribution ratio of an auxiliary magnetic line of force to a main magnetic line of force and irregularity in image density.
Figure 9:
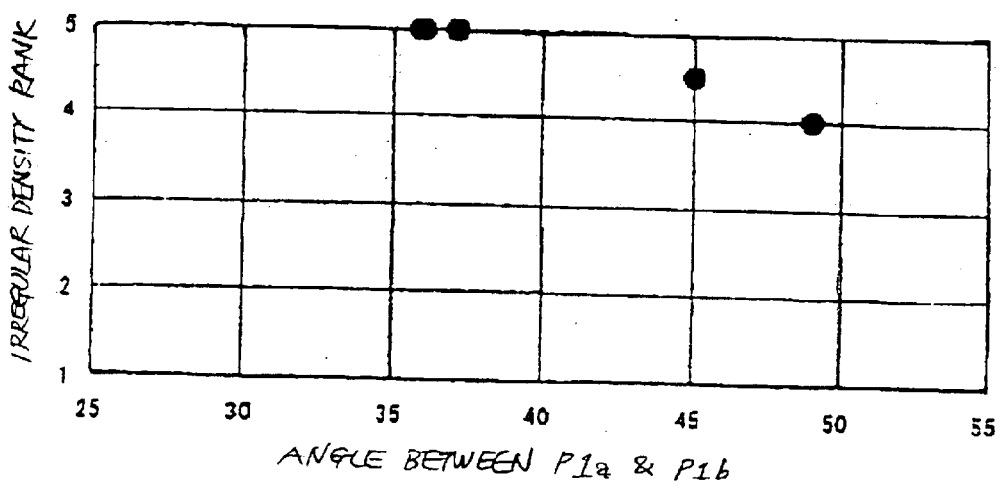
FIG. 9 is a graph showing a relation between an angle between the peak of the main magnetic line of force and that of the auxiliary magnetic line of force and irregularity in image density.
Figure 10:
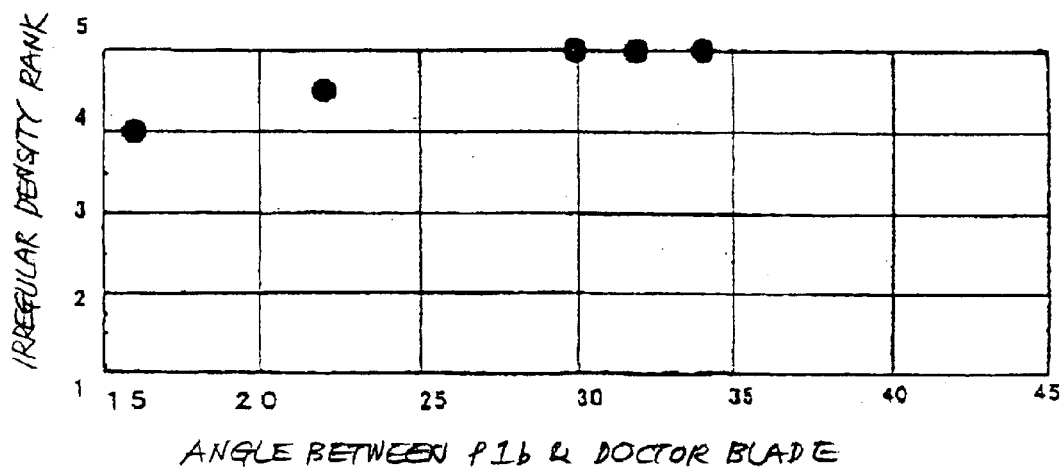
FIG. 10 is a graph showing a relation between an angle between a doctor blade and the peak of the auxiliary magnetic line of force and irregularity in image density.

FIGS. 8 through 10 show experimental results showing relations between the image density and the previously mentioned flux density ratio and angles θ1 and θ2. More specifically, FIGS. 8 through 10 estimate irregularity in the density of an image in the vertical direction with respect to a plurality of ranks. Rank 5 indicates that irregularity is acceptable to 95% of users. Rank 4.5 indicates that irregularity in a halftone image is acceptable to 80% of users while rank 4 indicates that the same irregularity is acceptable only to 70% of users. Ranks 4.5 and above were considered to show images free from irregularity in the vertical direction.

In FIG. 8, the ordinate indicates the rank while the abscissa indicates the ratio of the flux density P1b of the auxiliary magnetic line of force P6 to the flux density P1a of the main magnetic line of force P1. As shown, ranks 4.5 and above were satisfied when the flux density ratio was 0.43 or above. In FIG. 9, the ordinate indicates the rank while the abscissa indicates the angle θ1 between the half-value center angle of the main magnetic line of force P1 and that of the auxiliary magnetic line of force P6. As shown, ranks 4.5 and above were satisfied when the angle θ1 was 45° or above. In FIG. 10, the ordinate indicates the rank while the abscissa indicates the angle θ2 between the half-value center angle of the auxiliary magnetic line of force P6 and the doctor blade 64 (P1b—doctor angle) As FIG. 10 indicates, ranks 4.5 and above were satisfied when the angle θ2 was 22° or above.

The experimental results shown in FIGS. 8 through 10 indicate that the grains of the developer 58 are replaced within the narrow range K as if they were agitated in the axial direction of the sleeve 30. This is because the developer 58 rises on the sleeve 30 before reaching the developing zone G and then falls down along the circumference of the sleeve 30 in the range K.

Assume that the outside diameter of the sleeve 30 is reduced to accelerate the movement of the magnet brush on the sleeve 30, i.e., the rotation speed of the magnet brush being retained by the magnetic line of force. Then, it is possible to improve irregularity in the toner content of the developer 58 and to agitate the developer 58 in the narrow range K for thereby obviating irregularity in the vertical direction. Experiments showed that such an improvement was more noticeable as the sleeve diameter decreased below 25 mm.

Another advantage attainable with a decrease in sleeve diameter is that the tip of the magnet brush on the sleeve 30 moves over a longer distance and further promotes agitation in the axial direction of the sleeve 30. This is also successful to free images from irregular density. Moreover, when an AC bias is applied to the sleeve 30 during development, it causes the toner to oscillate in the developing zone and thereby obviates irregular toner content in the narrow range. Consequently, irregular image density on a sheet is obviated.

While the illustrative embodiment positions a single auxiliary magnetic line of force P6 between the doctor blade 64 and the developing zone G, a plurality of auxiliary magnetic line of force may, of course, be positioned there. Although the outside diameter of the drum 26 is assumed to be 16 mm, the crux is that it be 25 mm or below.

The illustrative embodiment is applicable not only to the copier shown and described, but also to a printer, facsimile apparatus or a multifunction machine.

As stated above, in the illustrative embodiment, the toner of the developer is efficiently agitated in the axial direction of the developer carrier in the narrow zone between the first metering member and the developing zone. The toner is therefore uniformly distributed and forms an image free from irregular image density in the vertical direction. In addition, the illustrative embodiment achieves a high developing ability.

An alternative embodiment of the present invention mainly directed toward the second object stated earlier will be described hereinafter. This embodiment is also practicable with the developing device shown in FIG. 7. The following description will concentrate on differences between the two embodiments.

Referring again to FIG. 7, when the magnetic carrier moved away from the developing zone G passes the opening 74, the fresh toner contacts the carrier being conveyed. As a result, the fresh toner is replenished to the carrier in an amount corresponding to the amount of toner consumed by development, automatically maintaining the toner content of the developer substantially constant, as stated earlier. This obviates the need for an exclusive member for agitating the toner and magnetic carrier. In this case, the toner and carrier are usually charged to 10 $\mu$q/g to 20 $\mu$q/g.

Figure 11:
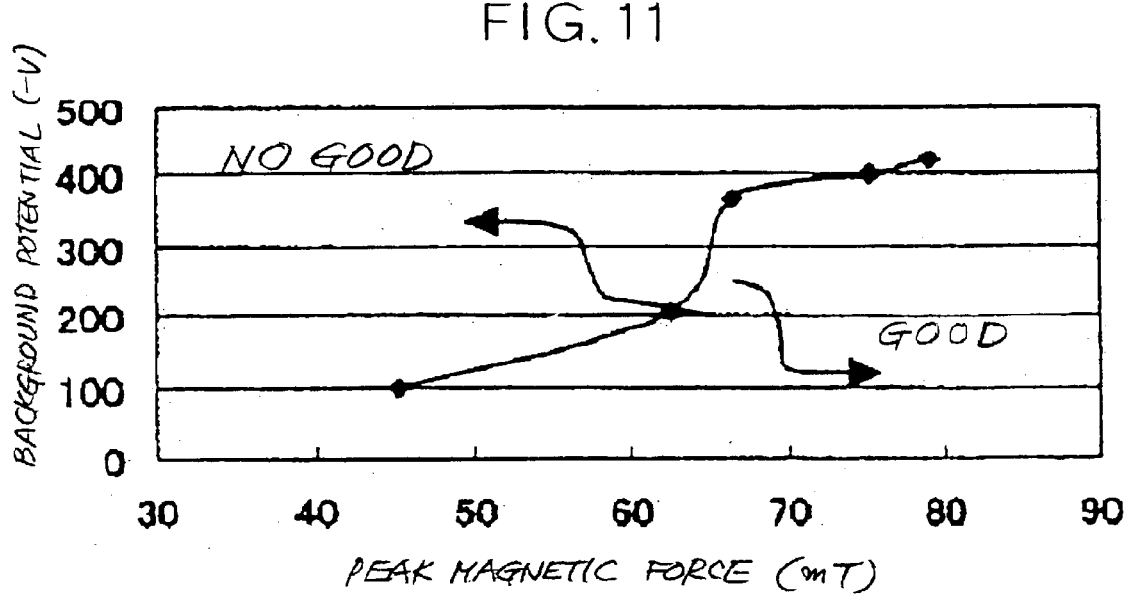
FIG. 11 is a graph showing a relation between the peak magnetic force of the developing roller and background potential.

In the illustrative embodiment, the magnet roller 62 has an auxiliary magnetic pole P2 in addition to the main magnetic pole P1 and auxiliary magnetic pole P6, as in the previous embodiment. The auxiliary poles P2 and P6 sandwich the main pole P1 and are opposite in polarity to the main pole P1. FIG. 11 is a graph showing a relation between the easiness of carrier deposition on the sleeve 30 and the peak magnetic force and background potential. As shown, the main pole P1 needs a peak magnetic force of 50 mT or above and should preferably have a peak magnetic force of 65 mT or above.

With the above configuration, the magnet roller 62 exerts a greater magnetic force for retaining the magnetic carrier. Therefore, when the magnet brush is cut off on contacting the drum 26 due to a shock, the magnetic force, which is greater than the force of the electric field on the surface of the drum 26, easily pulls the carrier toward the sleeve 30. This prevents the carrier from depositing on the non-image portion of the drum 26 and then being transferred to a sheet during image transfer and fixation; otherwise, the carrier would scratch the heat roller of the fixing device or would bring about defective images.

More specifically, as shown in FIG. 7, the magnet roller 62 additionally includes magnetic poles P3, P4 and P5. The pole P4 scoops up the developer to the sleeve 30. The poles P5 and P6 each convey the developer deposited on the sleeve 30 to the developing zone G. The poles P2 and P3 each convey the developer in the zone following the developing zone G. The poles P1 through P6 each are oriented in the radial direction of the sleeve 62.

While only six magnets are shown in FIG. 7, additional magnets may be arranged between the pole P3 and the doctor blade 64 in order to improve a black solid image. For example, two or four additional magnets may be arranged between the pole P3 and the doctor blade 64.

As the magnetic field (dotted line) formed by the main pole P1 indicates, the main pole P1 is implemented by a magnet having a small cross-sectional area. Generally, a magnetic force decreases with a decrease in the cross-sectional area of a magnet. If the magnetic force on the sleeve surface is excessively weak, then it is likely that the force retaining the carrier grains is too weak to prevent the carrier from depositing on the drum 1. In light of this, in the illustrative embodiment, the magnet M1 forming the main poles P1 is formed of a rare earth metal alloy that exerts a strong magnetic force. Typical of magnets formed of rare earth metal alloys are an iron-neodium-boron alloy magnet having the maximum energy product of 358 kJ/m$^3$ and an iron-neodium-boron alloy bond magnet having the maximum energy product of about 80 kJ/m$^3$. Such maximum energy products each are greater than, e.g., the maximum energy product of about 36 kJ/m$^3$ available with a conventional ferrite magnet or the maximum energy product of about 20 kJ/m$^3$ available with a conventional ferrite bond magnet. Consequently, even the magnet having a small cross-sectional area can insure the expected magnetic force on the sleeve surface. A samarium-cobalt metal alloy magnet is another magnet that can insure the above magnetic force.

In the above configuration, the main pole P1 has its half width reduced and therefore reduces the nip width. This causes a minimum of toner drift to occur and thereby reduces the omission of a trailing edge.

Moreover, the auxiliary poles P2 and P6 intensify the turn-round of the magnetic line of force issuing from the main pole P1, thereby increasing the attenuation ratio of the flux density at the nip in the normal direction. The resulting dense magnet brush is uniform at the nip in the axial direction of the sleeve 30, reducing the omission of a trailing edge over the entire axial range of the sleeve.

Even when the main pole P1 is not accompanied by the auxiliary poles, the turn-round of the magnetic line of force to the other poles for conveyance is intensified. Consequently, the magnet brush at the nip becomes dense if the attenuation ratio of the flux density in the normal direction is 40% or above, obviating the omission of a trailing edge.

It is to be noted that the AD bias applied to the developing zone G is desirable because the mechanism described above sometimes makes the toner content of the developer partly irregular.

The fresh toner is automatically replenished to the developer collecting space 66 in accordance with the toner content of the developer and maintains the toner content substantially constant, as stated earlier. It is therefore not necessary to use a sophisticated toner content control mechanism including a toner content sensor and a replenishing member to be driven in accordance with the output of the sensor. Further, there can be obviated an occurrence that the amount of charge deposited on the toner and carrier temporarily increases due to a time lag in toner replenishment. This prevents the carrier from depositing on the drum 26.

The automatic toner content control has another advantage that the toner does not have to be agitated. Stress ascribable to agitation increases the stress of the toner and carrier, increasing the amount of charge, as stated earlier. It is therefore necessary to raise a bias for development. Such a bias, however, reduces the service life of the image carrier.

In the illustrative embodiment, the half width of the main pole is smaller at the center than at the edges for thereby reducing the nip width and therefore toner drift. This advantageously obviates the omission of a trailing edge and enhances the reproduction of thin lines. Further, the attenuation ratio of the flux density in the normal direction is higher at the center in the axial direction of the sleeve 30 than at the edges, so that the magnet brush is more dense and shorter at the center than at the edges. Such a magnet brush further promotes the obviation of the omission of a trailing edge while further enhancing the reproduction of thin lines. Moreover, the zero gauss transition point is greater at the center than at the edges, so that the developer rises on the sleeve 30 more narrowly than at the edges. This also reduces toner drift and therefore defective images.

As stated above, the illustrative embodiment obviates the need for an exclusive member for agitating the toner and magnetic carrier to thereby reduce the stress of the toner and carrier. As a result, the amount of charge to deposit on the toner and carrier decreases. This, coupled with the fact that the magnetic force of the magnetic field forming means is increased, allows the carrier, which the above charge or the magnetic force cannot retain alone, to be surely retained on the developer carrier. The illustrative embodiment therefore effectively prevents the carrier from depositing on the image carrier. This advantage is also achievable because the amount of charge does not vary without regard to the timing of toner replenishment.

Further, the illustrative embodiment obviates irregular image density despite that the developer has a small outside diameter. In addition, the small outside diameter reduces the overall size of the developing device.

Moreover, the AC bias applied to the developing zone increases the amount of effective toner for thereby implementing high quality images free from irregular density.

Various modifications will become possible for those skilled in the art after receiving the teachings of the present disclosure without departing from the scope thereof.

What is claimed is:

1. A developing device comprising:
    a developer carrier configured to convey a developer, which includes toner and a magnetic carrier, deposited thereon and causing, in a developing zone, said developer to form a magnet brush with a main magnetic line of force issuing from a main magnetic pole, which is positioned inside said developer carrier, said toner being fed to an image carrier in said developing zone;
    a first metering member positioned upstream of the developing zone in a direction of developer conveyance and configured to regulate an amount of the developer being conveyed by said developer carrier toward said developing zone;
    a space configured to collect part of the developer removed by said first metering member;
    a toner hopper adjoining said space configured to replenish fresh toner to said developer carrier;
    a second metering member positioned upstream of said first metering member in the direction of developer conveyance; and
    a gap formed between said second metering member and said developer carrier configured to prevent, when a toner content of the developer on said developer carrier increases in order to increase a thickness of said developer forming a layer on said developer carrier, an increment of said developer carrier from passing;
    wherein a condition in which the developer and the fresh toner contact each other varies in accordance with the toner content of said developer present on said developer carrier for thereby varying a condition of replenishment of said fresh toner to said developer, and
    a peak of at least one auxiliary magnetic line of force is positioned between the developing zone and said first metering member.

2. The device as claimed in claim 1, wherein a flux density ratio of said auxiliary magnetic line of force to said main magnetic line of force is 0.43 or above.

3. The device as claimed in claim 2, wherein an angle between a peak of said main magnetic line of force and the peak of said at least one auxiliary line of force is 45° or below.

4. The device as claimed in claim 3, wherein an angle between said first metering member and the peak of said at least one auxiliary magnetic line of force is 22° or above.

5. The device as claimed in claim 4, wherein said developer carrier has an outside diameter of 25 mm or below.

6. The device as claimed in claim 5, wherein an AC bias is applied to the developing zone.

7. The device as claimed in claim 1, wherein an angle between a peak of said main magnetic line of force and the peak of said at least one auxiliary line of force is 45° or below.

8. The device as claimed in claim 7, wherein an angle between said first metering member and the peak of said at least one auxiliary magnetic line of force is 22° or above.

9. The device as claimed in claim 8, wherein said developer carrier has an outside diameter of 25 mm or below.

10. The device as claimed in claim 9, wherein an AC bias is applied to the developing zone.

11. The device as claimed in claim 1, wherein an angle between said first metering member and the peak of said at least one auxiliary magnetic line of force is 22° or above.

12. The device as claimed in claim 11, wherein said developer carrier has an outside diameter of 25 mm or below.

13. The device as claimed in claim 12, wherein an AC bias is applied to the developing zone.

14. The device as claimed in claim 1, wherein said developer carrier has an outside diameter of 25 mm or below.

15. The device as claimed in claim 14, wherein an AC bias is applied to the developing zone.

16. The device as claimed in claim 15, wherein an angle between a peak of said main magnetic line of force and the peak of said at least one auxiliary line of force is 45° or below.

17. In an image forming apparatus including a developing device for feeding toner to a latent image formed on an image carrier to thereby form a corresponding toner image, said developing device comprising:
    a developer carrier configured to convey a developer, which includes the toner and a magnetic carrier, deposited thereon and causing, in a developing zone, said developer to form a magnet brush with a main magnetic line of force issuing from a main magnetic pole, which is positioned inside said developer carrier, said toner being fed to an image carrier in said developing zone;
    a first metering member positioned upstream of the developing zone in a direction of developer conveyance configured to regulate an amount of the developer being conveyed by said developer carrier toward said developing zone;

a space configured to collect part of the developer removed by said first metering member;

a toner hopper adjoining said space configured to replenish fresh toner to said developer carrier;

a second metering member positioned upstream of said first metering member in the direction of developer conveyance; and a gap formed between said second metering member and said developer carrier configured to prevent, when a toner content of the developer on said developer carrier increases in order to increase a thickness of said developer forming a layer on said developer carrier, an increment of said developer carrier from passing;

wherein a condition in which the developer and the fresh toner contact each other varies in accordance with the toner content of said developer present on said developer carrier for thereby varying a condition of replenishment of said fresh toner to said developer, and a peak of at least one auxiliary magnetic line of force is positioned between the developing zone and said first metering member.

18. A developing device comprising:

a developer carrier accommodating magnetic field forming means thereinside for conveying a developer, which includes toner and a magnetic carrier, deposited thereon;

a first metering member configured to regulate an amount of the developer being conveyed by said developer carrier;

a space configured to collect part of the developer removed by said first metering member;

a toner hopper adjoining said space configured to replenish fresh toner to said developer carrier;

a second metering member positioned upstream of said first metering member in a direction of developer conveyance; and a gap formed between said second metering member and said developer carrier for preventing, when a toner content of the developer on said developer carrier increases in order to increase a thickness of said developer forming a layer on said developer carrier, an increment of said developer carrier from passing;

wherein a condition in which the developer and the fresh toner contact each other varies in accordance with the toner content of said developer present on said developer carrier for thereby varying a condition of replenishment of said fresh toner to said developer, an exclusive agitating member for agitating the carrier and the toner is absent, and said magnetic field forming means exerts a great peak magnetic force of 50 mT or above.

19. The device as claimed in claim in 18, wherein said developer carrier has an outside diameter of 25 mm or below.

20. The device as claimed in claim 18, wherein an AC bias is applied to a developing zone where said developer carrier and an image carrier face each other.

21. A developing device comprising:

a developer carrier accommodating magnetic field forming means thereinside for conveying a developer, which includes toner and a magnetic carrier, deposited thereon;

a first metering member configured to regulate an amount of the developer being conveyed by said developer carrier;

a space configured to collect part of the developer removed by said first metering member;

a toner hopper adjoining said space configured to replenish fresh toner to said developer carrier;

a second metering member positioned upstream of said first metering member in a direction of developer conveyance; and a gap formed between said second metering member and said developer carrier configured to prevent, when a toner content of the developer on said developer carrier increases in order to increase a thickness of said developer forming a layer on said developer carrier, an increment of said developer carrier from passing;

wherein a condition in which the developer and the fresh toner contact each other varies in accordance with the toner content of said developer present on said developer carrier for thereby varying a condition of replenishment of said fresh toner to said developer, replenishment of the fresh toner to the developer is effected without control from outside of said developing device, and said magnetic field forming means exerts a peak magnetic force of 50 mT or above.

* * * * *